(12) United States Patent
Jogalekar

(10) Patent No.: US 7,002,977 B1
(45) Date of Patent: Feb. 21, 2006

(54) POLICY BASED ACCOUNTING AND BILLING FOR NETWORK SERVICES

(75) Inventor: Prasad P. Jogalekar, Sunnyvale, CA (US)

(73) Assignee: Luminous Networks, Inc., Cupertino, CA (US)

( * ) Notice: Subject to any disclaimer, the term of this patent is extended or adjusted under 35 U.S.C. 154(b) by 944 days.

(21) Appl. No.: 09/895,766

(22) Filed: Jun. 29, 2001

(51) Int. Cl.
*H04L 12/28* (2006.01)
*H04L 12/56* (2006.01)

(52) U.S. Cl. ...................... 370/410; 370/389

(58) Field of Classification Search ........... 370/410, 370/400, 426, 351, 236, 236.1, 377, 371, 370/368, 381, 395.51, 901, 908, 401, 463, 370/389, 395.1, 522, 419; 705/34, 40; 708/110; 364/464.01; 379/114.15–114.26, 115.01–115.02, 379/120, 127.01, 127.03, 133–134, 114.27, 379/114.28, 114.03; 709/238, 224, 235, 709/200, 241, 227, 239, 226, 243, 225, 105, 709/232, 229, 203, 242, 245
See application file for complete search history.

(56) References Cited

U.S. PATENT DOCUMENTS

| | | | | |
|---|---|---|---|---|
| 6,097,719 A | * | 8/2000 | Benash et al. | 370/352 |
| 6,310,873 B1 | * | 10/2001 | Rainis et al. | 370/356 |
| 6,625,657 B1 | * | 9/2003 | Bullard | 709/237 |
| 6,751,663 B1 | * | 6/2004 | Farrell et al. | 709/224 |
| 6,804,711 B1 | * | 10/2004 | Dugan et al. | 709/223 |
| 6,834,341 B1 | * | 12/2004 | Bahl et al. | 713/156 |
| 6,854,014 B1 | * | 2/2005 | Amin et al. | 709/227 |
| 2001/0033570 A1 | * | 10/2001 | Makam et al. | 370/373 |
| 2002/0052915 A1 | * | 5/2002 | Amin-Salehi | 709/203 |
| 2002/0075844 A1 | * | 6/2002 | Hagen | 370/351 |
| 2002/0091636 A1 | * | 7/2002 | Carroll Bullard | 705/40 |

* cited by examiner

*Primary Examiner*—Wellington Chin
*Assistant Examiner*—Jamal A. Fox
(74) *Attorney, Agent, or Firm*—Sawyer Law Group LLP

(57) ABSTRACT

A system and method are disclosed for policy based accounting and billing for network services. In one embodiment, a packet forwarding device receives a packet to be forwarded over the network, accesses a policy table to identify a billing party associated with the packet, obtains billing information, and stores a record of the forwarded packet and the associated billing party.

18 Claims, 8 Drawing Sheets

Policy Table 600

| | Traffic Source | Traffic Destination | Traffic Admission | Service Grade | Time | Authorization | Billing Party | Billing Mechanism |
|---|---|---|---|---|---|---|---|---|
| 620 | A | Any | Any | General | Any | None | A | Decrement prepaid general account |
| 622 | A | Any | Any | Premium | Any | None | A | Increment premium account |
| 624 | A | Any | Priority | General | Any | None | A | Increment priority account |
| 626 | Any | C | Any | General | 8am-6pm weekdays | None | C | Increment general account |
| 628 | Any | C | Any | General | Any | C | C | Increment general account |
| 630 | B | D | Any | General | Any | None | D | Decrement prepaid account |
| 632 | B | Any | Any | General | Any | None | D | Increment general account |
| 634 | B | Any | Any | Premium | Any | D | D | Increment premium account |

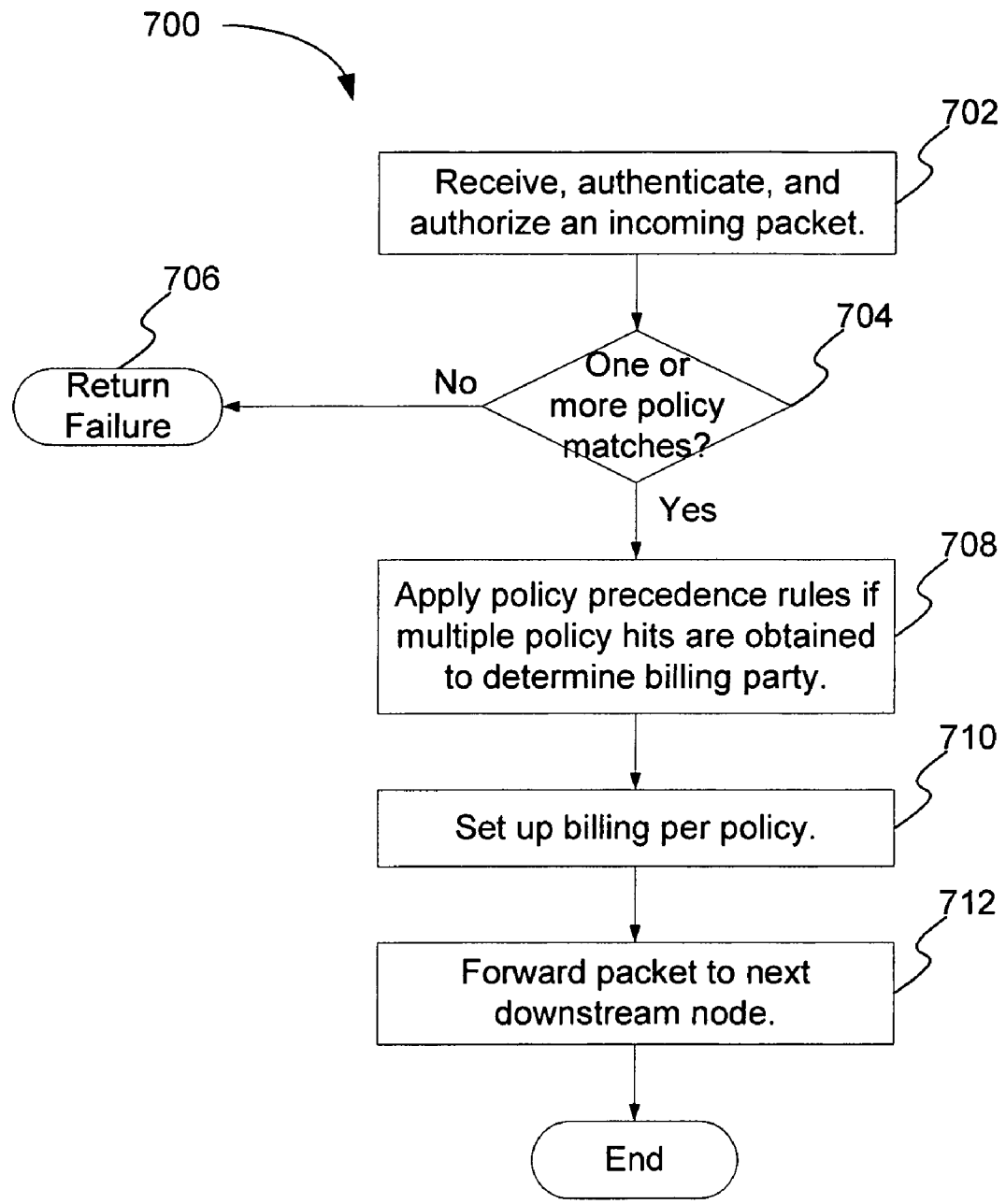
FIG. 7 Intermediate Interface

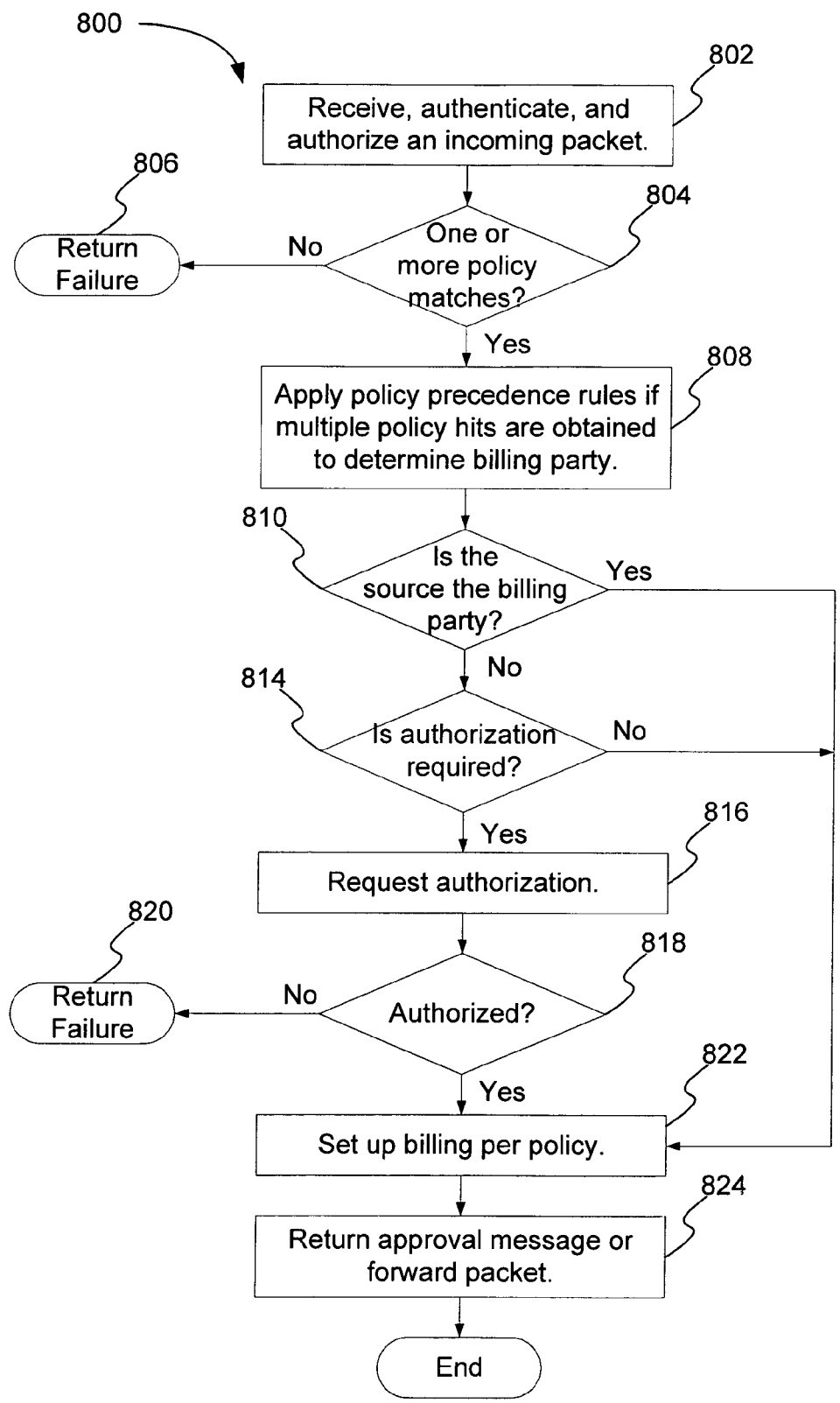
FIG. 8 Terminating Interface

POLICY BASED ACCOUNTING AND BILLING FOR NETWORK SERVICES

BACKGROUND

1. Technical Field

The present invention relates to systems and methods for accounting and billing for network services and, in particular, to policy based accounting and billing systems and methods.

2. Description of the Related Art

In the past, Wide Area Networks (WANs), Metro Area Networks (MANs), enterprise networks, and the like have been used for transmitting data between computers. Such networks may use protocols such as Internet Protocol (IP) or Multi-Protocol Label Switching (MPLS) protocol for routing data packets through a given network.

Accounting and billing for use of such networks has typically been by at least one of two methods. The first method generally includes charging a customer a flat rate, such as a flat monthly rate, for a fixed amount of bandwidth. Under this approach, each customer is billed the same amount each month regardless of: the amount of bandwidth actually used by the customer, the various destinations of the various data packets transmitted or received, the time of day the packets are transmitted or received, or the type of packets transmitted. Thus, this approach is generally limits the ability to provide a network customer with an accounting and billing system tailored to the customer's needs.

The second method includes billing the customer on a per-packet basis for each data packet transmitted by the customer. Pursuant to this method, a network device records each packet transmitted by the customer using a packet counter, which increments for each packet transmitted by the customer. The customer is then billed according to the number of recorded packets transmitted during a particular time period. Under this approach, customers are usually billed, regardless of: the nature of the transmitted packet, the destination of the packet, the time of day the packet was transmitted, the number of packets received by the customer, or the route traversed by the packet to reach its destination.

A need exists, therefore, for a more sophisticated system and method for accounting and billing for network services. An additional need exists for a system and method for accounting and billing for network services that may be employed with conventional protocols, such as the MPLS and IP protocols.

SUMMARY

The present invention overcomes, or substantially alleviates, problems associated with providing sophisticated accounting and billing for network services. In general, a packet forwarding device accesses a policy table to identify a billing party for a particular packet transmission. The billing party may be the sender of the packet, the recipient of the packet, or a third party. In addition, various payment methods are provided, such as incrementing an account on a per packet basis, decrementing a prepaid account on a per packet basis, charging a priority rate for packets sent with high priority, and charging a premium rate for packets associated with a premium network service.

Pursuant to one embodiment, a packet forwarding device in the network receives a data packet to be routed, or switched, across the network and accesses a policy table to determine a billing party associated with the data packet. The packet forwarding device may also access the policy table to determine billing and accounting details associated with the packet and billing party. For example, the details may include information regarding whether the billing party has a prepaid account that is decremented for each packet transmitted or whether the billing party has an account that is incremented for each packet transmitted. Additional billing details may include, for example, whether any approval is required before forwarding the packet, whether the packet is a premium packet that is billed at a different rate than other packets, and whether the packet is a high priority packet.

In an example embodiment, the present invention may be employed in a Multi-Protocol Label Switching (MPLS) network. Pursuant to this embodiment, an ingress packet forwarding device at the network ingress receives an LSP accounting signaling message packet. This packet forwarding device then determines both the information required for routing of the packet and for the billing for the packet before forwarding the packet over the network. The packet forwarding device determines the billing by accessing policy information, such as a policy table.

If the ingress packet forwarding device approves the LSP setup message for both billing and forwarding, the ingress packet forwarding device sends a Label Switched Path (LSP) setup request message to the next node, or packet forwarding device, on a path through the network. If the network ingress packet forwarding device does not approve the LSP setup message for routing and billing, the ingress packet forwarding device returns a failure message to the source of the packet. The next packet forwarding device, in turn, accesses its local policy table to determine the billing and forwarding data for the packet associated with the LSP setup request message. The LSP setup phase, in one embodiment, is thus broken into two logical phases at each node: the first phase deals with packet forwarding and the second phase deals with accounting and billing.

If the intermediate packet forwarding device approves the packet for both billing and routing, then the intermediate packet forwarding device forwards the LSP setup message, along with any necessary routing information, to the next packet forwarding device. The network egress packet forwarding device accesses a policy table to determine the billing for the packet. If the egress packet forwarding device approves the billing for the packet, the egress packet forwarding device transmits a message to the ingress packet forwarding device through the packet forwarding devices along the path to indicate billing and routing approval. The billing mechanism may be implemented on top of existing MPLS protocol, which implements the packet forwarding aspects for the label switched packets.

The ingress packet forwarding device then transmits data packets through the LSP. Each packet forwarding device along the LSP may record transmission of the data packets forwarded and billing information regarding the packet. The egress node forwards the packet out of the network and may also record the transmission and the billing information regarding the packet.

After the collapse, or termination of, the MPLS tunnel, each packet forwarding device along the LSP may transmit information regarding the packets forwarded by the packet forwarding device and the associated billing and accounting information to a network management computer. The network management computer may store and compile the information received from the various packet forwarding devices. In one embodiment, the network management computer disregards transmissions from all packet forwarding devices except the network egress node.

Accordingly, the system and method of the present invention permit for improved accounting and billing for network services. These and other aspects, features, and capabilities of the present invention will be clear from a reading of the following detailed description of the exemplary embodiments and the accompanying drawings.

BRIEF DESCRIPTION OF THE DRAWINGS

FIG. 6 is an example policy table that may be used in the policy engine of the FIG. 4 controller.

FIG. 7 is a flowchart illustrating one embodiment of a method of operation of the FIG. 1 egress packet forwarding device.

FIG. 8 is a flowchart illustrating one embodiment of a method of operation of a FIG. 1 intermediate packet forwarding device.

DETAILED DESCRIPTION

Figure 1:
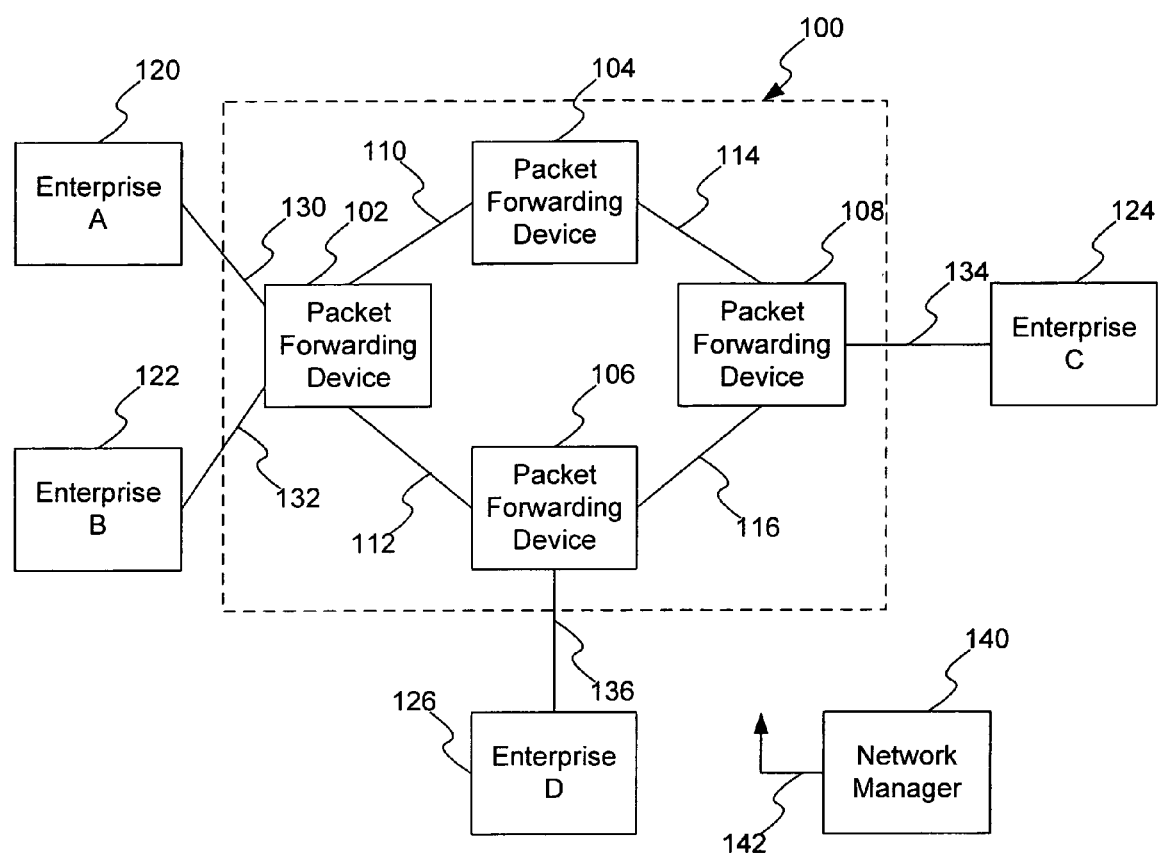
FIG. 1 illustrates one embodiment of a network in which the present invention may be practiced.

FIG. 1 illustrates a network 100 that includes packet forwarding devices 102, 104, 106, and 108. The network 100 may comprise a Wide Area Network (WAN), a Metro Area Network (MAN), an enterprise network, a combination of these, or the like. Each of the packet forwarding devices 102–108 may comprise a switch, a router, or a packet forwarding device having the ability to function as either a switch or a router and may be configured to forward data packets such as IP data packets, MPLS data packets, or both. As those skilled in the art will appreciate, the terms "packet" and "data packet" generally refer to a group of binary digits that is switched or routed as a composite whole.

As shown, the packet forwarding devices 102–108 are interconnected to form the network 100. In particular, the packet forwarding device 102 is shown as being coupled to the packet forwarding device 104 by a link 110. The packet forwarding device 102 is also coupled to the packet forwarding device 106 by a link 112. The packet forwarding device 104 is interposed between the packet forwarding device 102 and the packet forwarding device 108 and is coupled to the packet forwarding device by a link 114. The packet forwarding device 106 is interposed between the packet forwarding device 102 and the packet forwarding device 108 and is coupled to the packet forwarding device by a link 116.

Each of the links 110–116 may comprise, for example, a fiber optic link, a wireless link, twisted pair link, TI link, or the like to permit data packets to be forwarded across the network 100 through a path, or tunnel, along multiple packet forwarding devices, such as the devices 102–108. Additional details regarding the packet forwarding devices 102–108 are illustrated in FIGS. 1–5 and are discussed below.

Enterprise A 120 and enterprise B 122 are coupled to the network 100 and may send and receive data packets over the network 100 to destinations such as enterprise C 124 and enterprise D 126. Enterprise A 120 may be coupled to a port of the packet forwarding device 102 by a link 130, enterprise B 122 may be coupled to a port of the packet forwarding device 102 by a link 132, the enterprise C 124 may be coupled to a port of the packet forwarding device 108 by a link 134, and the enterprise D 126 may be coupled to a port of the packet forwarding device 106 by a link 136. Any of the enterprises 120–126 may comprise one or more of the following: a subnetwork, a core network, an edge network, a Local Area Network (LAN), an Enterprise network, or a single transceiver.

The links 130–136 may comprise analog, digital, wireless, xDSL, Ethernet, ISDN, coaxial cable, TI, T3, links or the like. In addition, the links 130–136 may also comprise links of different types for permitting the various respective enterprises 120–126 to exchange data packets with each other and other enterprises over the network 100. In one embodiment, the link 134 comprises an Internet backbone link, such as a T1/E1 or T3/E3 link, for permitting the packet forwarding device 108, and perhaps other devices, to exchange data with the enterprise C 124 over relatively long distances.

A network manager computer 140 is coupled to each of the packet forwarding devices 102–108 via one or more links 142 and may comprise a personal computer. As described in more detail below, the network manager computer 140 may transmit policy information over the link 142 to the various packet forwarding devices 102–108. In addition, packet forwarding devices 102–108 may send packet forwarding, accounting, and billing information regarding the packets forwarded over the network 100 and the associated billing parties to the network manager computer 140 over the link 142. The network manager computer 140, in turn, receives and compiles such information for accounting and billing purposes.

As those skilled in the art will appreciate, MPLS is an Internet Engineering Task Force (IETF)—specified framework that provides for efficient designation, routing, forwarding, and switching of traffic flows through a network, such as the network 100. In general, MPLS specifies mechanisms to manage traffic flows of various granularities, such as flows between different hardware, machines, or even flows between different applications. Moreover, MPLS provides for mapping of IP addresses to simple, fixed-length labels used by the various packet-switching devices 102, 104, 106, and 108 and may support, for example, IP, ATM, and frame-relay Layer-2 protocols.

In an MPLS network, data transmission typically occurs on Label Switched Paths (LSPs). LSPs use a sequence of labels at each of the packet-forwarding devices, also referred to as "nodes" along a path from a source to a destination and define a path, or a "tunnel" through a network. LSPs are typically established prior to actual data transmission. The labels may be distributed using conventional Label Distribution Protocol (LDP) or ReSource ReserVation Protocol (RSVP) or piggybacked on routing protocols such as Border Gateway Protocol (BGP) and Open Shortest Path First (OSPF). Each data packet encapsulates and carries the labels during the data packet's travel from source to destination. High-speed switching of data is possible because the fixed-length labels are inserted at the very beginning of the packet and can be used by the packet forwarding devices, such as the packet forwarding devices 102–108 to forward packets quickly over the network 100.

A label is carried or encapsulated in a Layer-2 header along with the packet. The receiving packet forwarding device, such as one of the packet forwarding devices 102–108 examines the packet for its label content to determine the next hop. Once a packet has been labeled, the rest of the journey of the packet through the network 100 is based on label switching. The packet forwarding device then forwards the packet based on the label.

In addition to performing packet forwarding functions pursuant to MPLS or another protocol, the packet forwarding devices 102–108, according to the present invention, also perform billing and accounting functions. As discussed in more detail below, each of the packet forwarding devices 102–108 accesses policy information, such as a policy table, to identify a valid billing party associated with the packet and forwards the packet only if the policy table identifies a billing party associated with the packet.

The packet forwarding devices 102–108 also record statistical data corresponding with the forwarding of the packet and the associated billing party. The packet forwarding device may also transmit the statistical data to the network manager 140 over the link 142 so that the network manager 140 can compile the statistical data received from the various devices 102–108. The statistical data may include, for example, for a particular one of the enterprises 120–126 the number of packets transmitted, the number of packets received, the service grade of each packet, the billing party for each of the packets, the payment mode associated with each packet.

Figure 2:
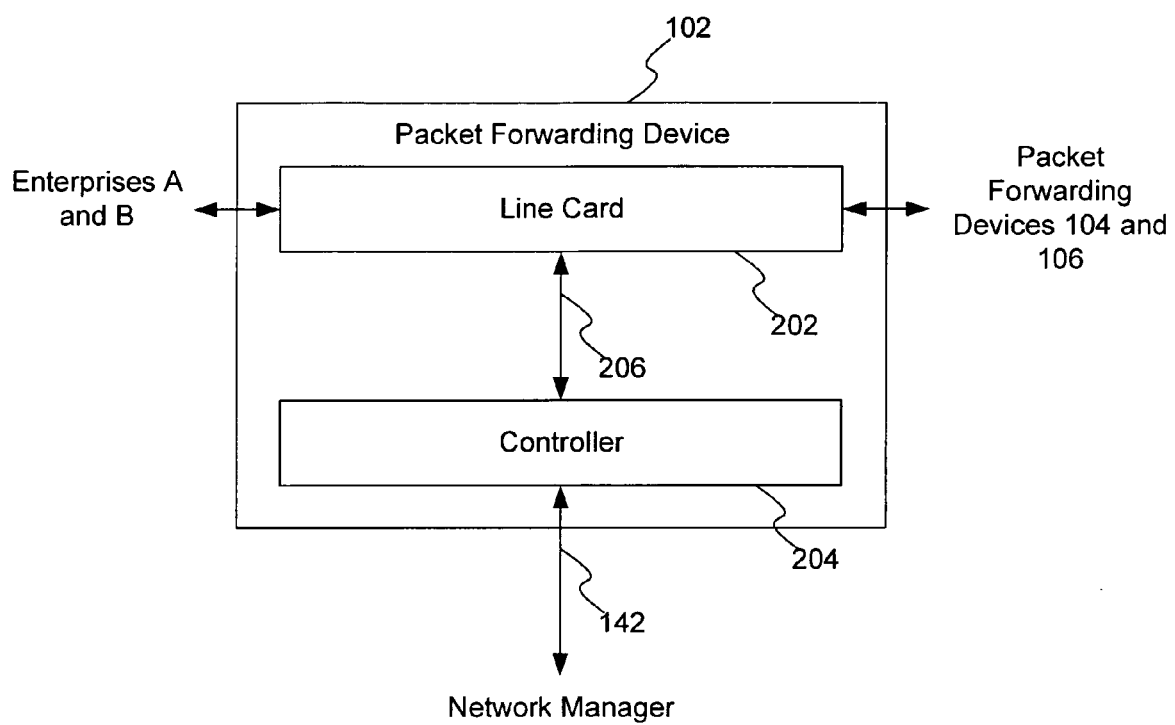
FIG. 2 illustrates details of a FIG. 1 packet forwarding device.

FIG. 2 illustrates details of the packet-forwarding device 102, which is configured identically to the packet forwarding devices 104–108. The packet-forwarding device 102 generally includes one or more line cards 202 and a controller 204 coupled to the line card 202. In general, the line card 202 classifies incoming data packets, applies policy rules to incoming data packets according to the classification of each, and forwards the incoming packets as dictated by the policy information. Those skilled in the art will appreciate that the packet forwarding device 102 may include multiple line cards 202 with each of which being controlled by the common controller 204. For purposes of clarity, only one line card 202 will be described herein.

Figure 3:
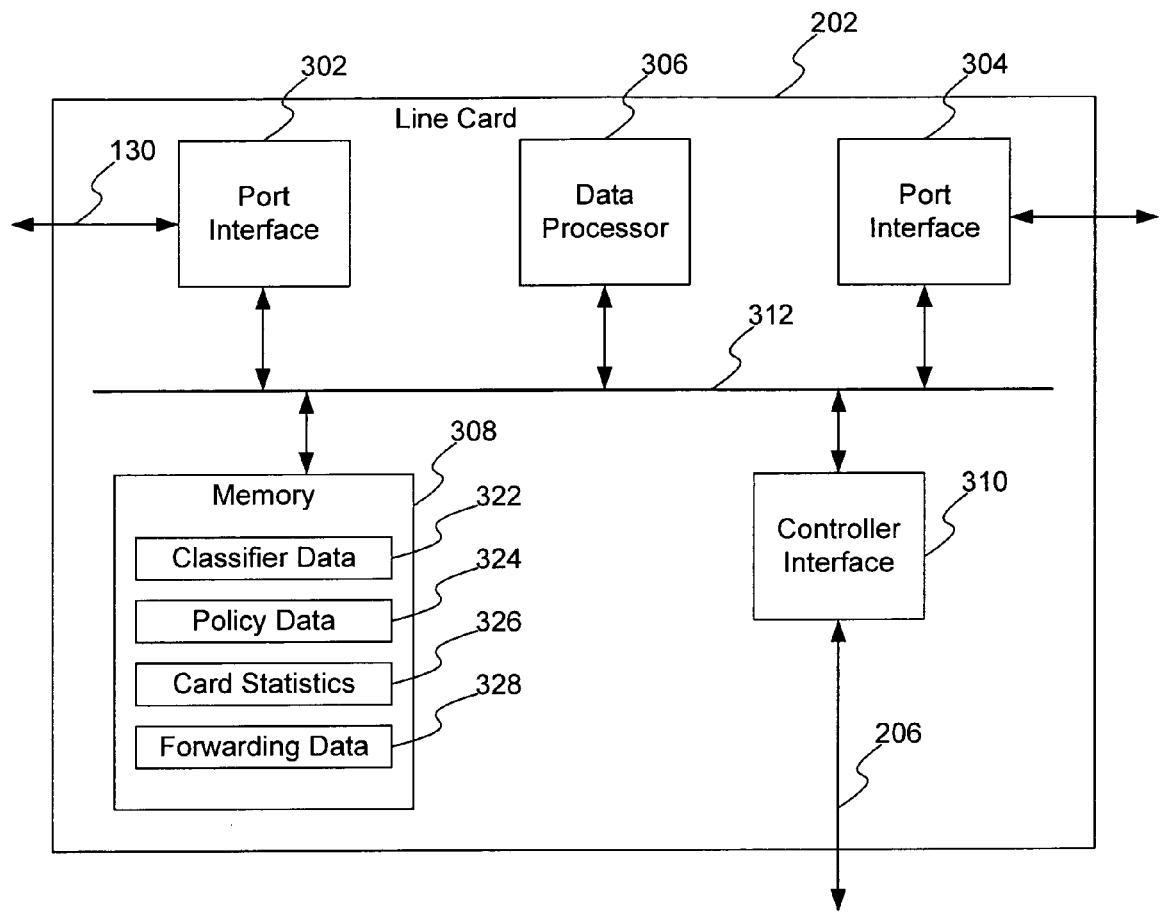
FIG. 3 illustrates details of the line card of FIG. 2.
Figure 4:
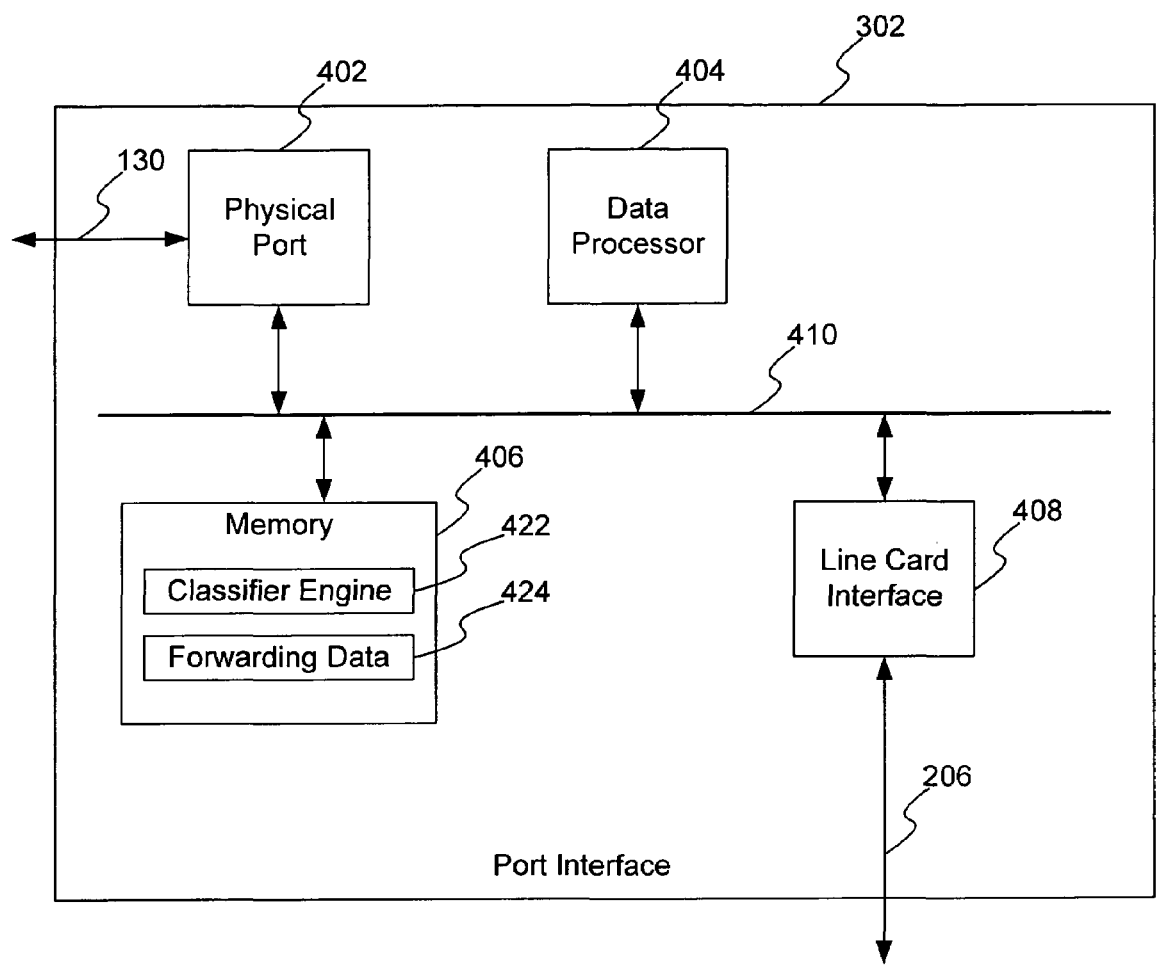
FIG. 4 illustrates details of the port interface of FIG. 3.
Figure 5:
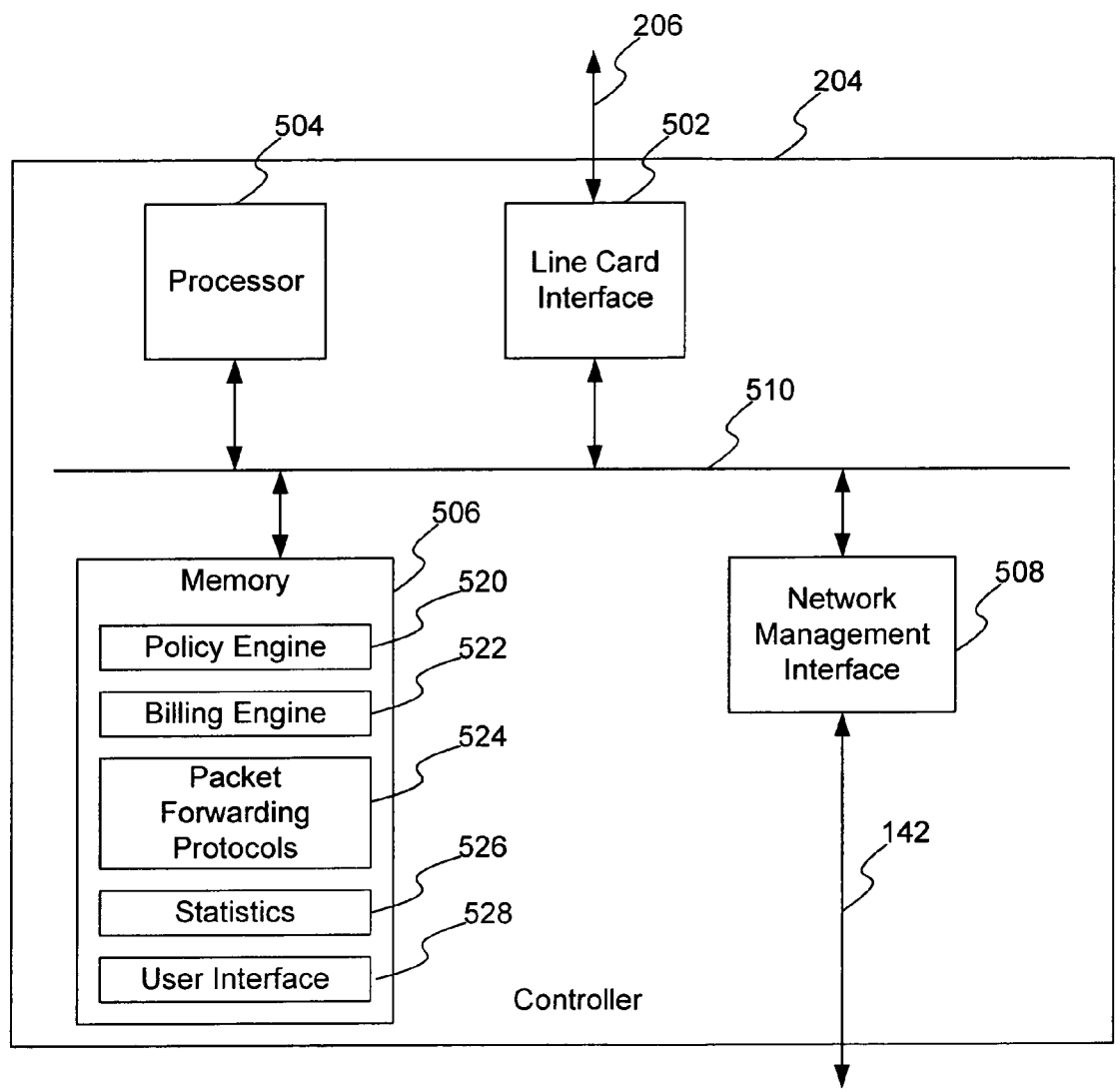
FIG. 5 illustrates details of the controller of FIG. 2.

The controller 204 generally performs MPLS tunneling, routing, statistical information collection and storage, functions. In addition, the controller 204 is coupled to the network manager computer 140 (FIG. 1) via the link 142 to transmit the statistical information to the network manager computer 140 and to receive changes to the policy information from the network manager computer 140. The controller 204 is coupled to the line card 202 over a bus 206. Those skilled in the art will appreciate, however, that the functions of the line card 202 and the controller 204 may be otherwise divided between the line card 202 and the controller 204 and line card 202. Optionally, the functionality of the controller 204 may be integrated with the line card 202. Details regarding the line card 202 are illustrated in FIGS. 3 and 4 and are discussed below. Details regarding the controller 204 are illustrated in FIG. 5 and are discussed below. Since the packet forwarding devices 104–108 are configured identically with the packet forwarding device 102, discussion of the packet forwarding device 102 applies also to the packet forwarding devices 104–108.

FIG. 3 illustrates details of the line card 202. The line card 202 includes port interfaces 302 and 304, a processor 306, a memory 308, and a controller interface 310, all coupled by at least one bus 312. The memory 308 includes classifier data 322, policy data 324, card statistics 326, forwarding data 328, and may comprise volatile memory or a combination of volatile and non-volatile memory. The processor 306 comprises a conventional data processor configured to process instructions from the port interfaces 302 and 304 and the controller interface 310 and performs synchronization between the line card 202 and the controller 204. The controller interface 310 may comprise any of a variety of interfaces for permitting communication between the controller 204 and the line card 202 over the line 206.

The classification data 322 includes rules regarding mapping data packets that enter the line card 202 to a set of applicable rules, including forwarding rules. The classification data 322 may include limits as to the rate and/or number of data packets that may be transmitted by or to a particular customer. Moreover, the classification data 322 may also include policing information that dictates which packets may be forwarded by the line card 202 and which will be dropped.

The policy data 324 includes policy information may comprise a policy table and includes policy rules specific to the line card 202. The policy rules may specify billing and accounting rules for packets received by the line card 202. An example policy table is illustrated in FIG. 6 and is described in more detail below.

The port interfaces 302 and 304 record the card statistics 326. The card statistics 326 may include information regarding the number of packets forwarded by the line card 202, the corresponding sources of such packets, the corresponding destinations of such packets, the LSP associated with the such packets if any, the time of forwarding the packets, and the billing and accounting mechanisms associated with the packets.

The forwarding data 328 may include a routing information, such as a routing table, for permitting the port interfaces 302 and 304 to make packet forwarding decisions. In one embodiment, the forwarding data may take the form of a Ternary Content Addressable Memory (TCAM).

FIG. 4 illustrates details of the FIG. 3 port interface 302, which is configured similar to the port interface 304. The port interface 302 generally includes a physical port 402, a processor 404, a memory 406, a line card interface 408, all coupled by at least one bus 410. The port interface memory 406 includes a classifier engine 422 and a forwarding engine 424 and may comprise a combination of volatile and nonvolatile memory. The physical port 402 includes MAC functionality and may comprise a Gigabit Ethernet port, a SONET port, a T1/E1 port, or the like, depending on the nature of the associated link 130.

Upon receiving data, such as a data packet at the physical port 402, the classifier engine 422 receives, authenticates, and authorizes the data packet. In one embodiment, the classifier engine 422 inspects a header portion of the data packet and determines source and destination address information, and uses the classifier data 322 (FIG. 3) to determine any limits, such as rate or packet limits, to be applied to the packet. Additionally, the classifier engine 422 identifies LSP signaling messages and passes the LSP signaling messages to the controller 204 over the bus 206.

The classifier engine 422 also writes the card statistics 326 regarding packets forwarded, dropped, or otherwise handled by the line card 202. These card statistics 326 may include source and destination addresses of the packets and applicable billing and accounting information regarding the packets handled by the line card 202. For example, for a given packet forwarded by the line card 202, the associated card statistics may include: the source and destination of the packet, the time the packet was handled by the line card 202, the path along which the line card 202 forwarded the packet, a service class associated with the packet, a billing party associated with the packet, and the accounting mechanism associated with the packet. The line card interface 408 permits communication between the port interface bus 410 and the bus 312 (FIG. 3) of the associated line card 202.

The forwarding engine 424 of the port interface 302 generally forwards packets approved for forwarding by the classifier engine 422 to a next hop in accordance with routing decisions made by IP or MPLS routing protocols and uses the forwarding data 328. The forwarding data 328 (FIG. 3) may include IP or MPLS routing tables and associated pointers. Optionally, the forwarding engine 424 may employ a Ternary Content Addressable Memory (TCAM) for packet routing purposes.

FIG. 5 illustrates details of the controller 204 (FIG. 2). As shown, the controller 204 is coupled to the line card 202 by bus 206 through a line card interface 502. The controller 204 also includes a processor 504, a memory 506, and a network management interface 508 all coupled by at least one bus 510. The line card interface 502 comprises any of a variety of conventional interfaces for permitting communication between the line card 202 and the controller 204 via respective buses 312 (FIG. 3) and 510. The network management interface 508 may comprise a modem or other transceiver for permitting communications between the network manager 140 (FIG. 1) and the controller 204 over the link 142 (FIG. 1).

The memory 506 includes a policy engine 520, a billing engine 522, packet forwarding protocols 524, controller statistics 526, and a user interface 528 and may comprise volatile memory or a combination of volatile and nonvolatile memory. The policy engine 520 contains policy information, such as a policy table, for each line card 202 within the packet-forwarding device 102, and may contain policy information for each line card within the network 100 (FIG. 1). The network manager 140 (FIG. 1) may provide and update policy information to the policy engine 520 over the link through a user interface 528, which may include a Graphical User Interface (GUI). A user at the network manager 140 may access the user interface 528 over the link 142 to provide or update policy information in the policy engine 520.

The policy information contained in the policy engine 520 may take the form of the policy table shown in FIG. 6, but may be more extensive, such as by including similar information for multiple line cards and more customers. The policy engine 520 provides and updates the policy data 324 (FIG. 3), which may relate only to the line card 202. Additional details regarding the operation of the policy engine 520 are discussed below with reference to FIGS. 7 and 8.

The billing engine 522 retrieves, and may compile, billing and accounting information from the card statistics 326 (FIG. 3) and stores the retrieved billing and accounting information to the statistics 526 of the controller 204. The card statistics 326 (FIG. 3) of the line card 202 may lack sufficient resources to store all of the card statistics that may be collected by the line card 202 over a period of time. The billing engine 522, therefore, periodically copies the contents of the card statistics memory 326 of the line card 302 to the statistics 526. Thus, when the storage capacity of the card statistics memory 326 is reached by the card statistics, the card statistics memory 326 may overwrite or otherwise delete stored card statistics without causing them to be lost, since they are stored in the statistics memory 526 of the controller 204. The billing engine 522 may copy the contents of the card statistics memory 326 after the expiration of a predetermined amount of time or after the packet forwarding device 102 has handled a predetermined number of packets.

In addition, the billing engine 522 transmits the controller statistics 526 to the network manager 140 (FIG. 1) over the link 142. The billing engine 522 may periodically transmit the controller statistics 526 to the network manager 140 (FIG. 1) over the link 142. Pursuant to one embodiment, the billing engine 522 may transmit the controller statistics 526 to the network manager 140 upon receiving a statistics request message from the network manager 140, after the expiration of a predetermined amount of time, or after the termination of a LSP.

The packet forwarding protocols 524 are illustrated as being stored in the memory 506 of the controller 204. The packet forwarding protocols 524 are conventional and may include packet forwarding protocols, such as MPLS, Internet Protocol (IP), and the like.

The processor 504 may comprise a conventional data processor and is configured to process instructions from the line card interface, the network management interface 508, and the memory 506.

FIG. 6 is an example policy table 600 that may be included in the policy data 324 (FIG. 3) and in the policy engine 520. Column 602 of the policy table 600 lists the source of the network traffic. Column 604 of the policy table 600 lists the destination of the network traffic. As described above, the source and destination of the network traffic may be determined by the classifier engine 422 (FIG. 4) of the port interface 302 by inspecting packet header information.

Column 606 of the policy table 600 lists the traffic admission, or priority, of the network traffic. Some network traffic may have a higher priority than other traffic. For example, certain time-sensitive network traffic may receive preferred network access than other lower priority network traffic. The traffic admission of a data packet may also be determined by the classifier engine 422 (FIG. 4), such as by inspection of a header portion of the data packet.

Column 608 of the policy table 600 lists the service grade of the network traffic. Certain types of network traffic may be associated with a premium service that is billed at an increased, or otherwise different, rate. For example, network traffic associated with the provision of real-time stock price quotes may be billed at a premium rate, whereas other network traffic may be billed at a normal rate.

Column 610 of the policy table 600 lists the period of time during which a particular policy rule is applicable.

Column 612 of the policy table lists whether a particular type of network traffic requires authorization, such as from a third-party, before the network traffic may be forwarded.

Column 614 of the policy table lists the billing party for the particular type of network traffic. As shown, the billing party may correspond to the source of the traffic, the destination of the traffic or a third party.

Column 616 lists the billing mechanism for the particular type of network traffic. The billing mechanism may be to decrement a prepaid general or premium account for each packet forwarded over the network 100, to increment a general or premium account for each packet forwarded over the network 100, or to increment or decrement a priority account.

The table 600 also includes rows 620–634 with each row defining a policy rule. For example, the row 620 comprises a policy rule that requires traffic from source A that is of normal traffic admission and of general service grade to be billed to A by decrementing a prepaid general account, without requiring authorization. Row 622, in contrast, requires traffic from source A that is of normal traffic admission and of a premium service grade to be billed to A by incrementing a premium account. Row 624 is identical to row 622, except that the row 624 applies to high priority traffic admission and is billed by incrementing A's priority account.

As another example, row 626 comprises a policy rule that requires that traffic directed to destination C during the hours of 8 a.m.–6 p.m. that is of normal traffic admission and of general service grade to be billed to C by incrementing a general account. In contrast, row 628 requires that traffic directed to destination C that is of general service grade be billed to C only after authorization by C and is billed by incrementing a premium account. Thus, for traffic destined for C during the hours of 8 a.m.–6 p.m., the policy rules of both rows 626 and 628 could apply.

To determine which of the policy rules defined by the rows 626 and 628 should apply, the policy engine 520 (FIG. 5) includes policy precedence rules (not shown) to determine which rule should govern. In this example, the rule of row 626 takes precedence over the rule of row 628 so that traffic sent to C during the hours of 8 a.m.–6 p.m. will be billed according to row 626 and traffic sent to C during other times will be billed according to row 628.

Row 630 shows that for a traffic source B, a traffic destination D, a normal traffic admission, a general service grade, transmitted anytime, is billed to D without authorization. The billing mechanism, as indicated in column 616, is by decrementing D's prepaid account, such as on a per-packet basis.

Row 632 shows that for a traffic source B, any traffic destination, a normal traffic admission, a general service grade, transmitted anytime, is billed to D without authorization. The billing mechanism, as indicated in column 616, is by incrementing D's general account, such as on a per-packet basis.

Row 634 shows that for a traffic source B, any traffic destination, a normal traffic admission, a premium service grade, transmitted anytime, is billed to D with pre-authorization from D. The billing mechanism, as indicated in column 616, is by incrementing D's premium account, such as on a per-packet basis.

In one embodiment, B and D could be different offices of a single customer with the offices located at different places and accessing the network 100 (FIG. 1) at different points with a VLAN established between B and D over the network 100. Pursuant to this embodiment, therefore, general service grade traffic from B to D is billed to D per the rule of row 630. General service grade traffic from B to destinations other than D is billed to D per the rule of row 632. Lastly, per row 634, premium grade traffic from B to any destination must be pre-approved by D before such traffic may be forwarded over any one of the devices 102–108 of the network 100.

In another embodiment, customer C may desire to encourage traffic to the destination C during the hours of 8 a.m.–6 p.m. Therefore, customer C may desire to be billed according to the policy rule of line 626 whereby customer C pays for all normal admission, general service grade traffic sent to destination C from any source during the hours of 8 a.m.–6 p.m.

FIG. 7 is a flowchart 700 illustrating a method for policy-based billing and accounting for network services according to one embodiment of the present invention. The flowchart 700 will be described in the context of the network 100 of FIG. 1, although the type, configuration, and underlying protocols of the network employed may vary.

Initially, at block 702, a packet forwarding device, such as the packet forwarding device 102 shown in FIGS. 1–6 and described above, receives, authenticates, and authorizes an incoming packet, such as an LSP accounting signaling or an IP packet. An LSP accounting signaling message is a message from a device requesting the initiation, or creation, of a Label Switched Path (LSP) using a policy map. Thus, in one embodiment, the packet forwarding device 102 may receive an LSP accounting signaling message or an IP packet over the link 130 (FIG. 1) from enterprise A 120.

At the block 702, the classifier engine 422 (FIG. 4) of the packet forwarding device 102 verifies the source of the packet, the destination of the packet, authenticates the packet, and authorizes the packet. The classifier engine 422 uses the classifier data 322 (FIG. 3) of the associated line card 202 in authenticating and authorizing the incoming packet.

Next, at block 704, the packet forwarding device 102 determines whether there is one or more policy matches for the received packet. In one embodiment, the line card 202 of the packet forwarding device 202 passes packet information regarding the received packet to the policy engine 520 (FIG. 5) of the controller 204. The packet information may include the source and destination of the packet, the associated service grade, and the associated traffic admission. The policy engine 520 then checks the information regarding the received packet against a policy table such as the policy table 600 of FIG. 6 to determine if one or more of the policy rules apply to the received packet. If there is no policy match, the packet forwarding device 102 returns a failure message, pursuant to block 706, to the source of the packet indicating a failed transmission.

If the policy engine 520 identifies one or more policy matches pursuant to block 704, execution proceeds to block 708 wherein policy precedence rules are applied if multiple policy hits are obtained to determine the billing party for or associated with packet and any associated traffic. As mentioned above with reference to FIG. 6, the policy engine 520 may obtain more than one policy hit for a given packet. For example, if the LSP accounting signaling message identifies D as a traffic destination and the LSP accounting signaling message is transmitted during 8 a.m.–6 p.m., there will be a policy hit for the policy rule of row 626 and a policy hit for the policy rule of row 628. Accordingly, the policy engine 520 includes policy precedence rules to determine which of multiple policy rules has precedence where there are multiple policy hits for a given LSP accounting signaling message. Hence, if the policy engine 520 identifies multiple policy hits, the policy engine 520 applies policy precedence rules to determine a single policy rule to employ and to identify a billing party.

Next, pursuant to block 710, the billing engine 522 (FIG. 5) sets up billing and accounting mechanisms per the single policy rule identified by the policy engine in block 708. In particular, the billing engine 522 creates service-specific counters such as either an incrementing count-up counter or a decrementing count-down counter depending on the particular policy rule identified by the policy engine 520. These counters may comprise a portion of the classifier engine 422 (FIG. 4) of the port interface 302, which counts the packets forwarded and writes corresponding statistics to the card statistics 326 of the associated line card 202. Moreover, the billing engine 522 communicates with the classifier engine 322 to exchange statistics.

Pursuant to block 712, the packet forwarding device 102 forwards the packet to the next downstream node. The next downstream node may comprise, for example, the packet forwarding device 106.

Each of the intermediate packet forwarding devices, such as the packet forwarding devices 102 and 106 of FIG. 1, follow the method 700 illustrated in FIG. 7 and described above. A terminating interface of the network 100, however, may employ the method illustrated in FIG. 8 according to one embodiment of the present invention. The terminating interface of the network 100 is the packet forwarding device at which a packet, such an LSB accounting signaling message, egresses the network 100.

FIG. 8 is a flowchart 800 illustrating a method for policy-based billing and accounting for network services according to one embodiment of the present invention. FIG. 8 will be described in the context of the network 100 of FIG. 1, although the type, configuration, and underlying protocols of the network employed may vary.

In one embodiment, the method illustrated in the flowchart 800 may be employed at a terminating interface of the network 100 (FIG. 1), such as the packet forwarding device 108. Initially, at block 802, a packet forwarding device such as the packet forwarding device 108, receives, authenticates, and authorizes an incoming packet, such as an LSP accounting signaling message, from a source internal the network 100, such as the packet forwarding device 106.

At the block 802, a classifier engine 422 (FIG. 4) of the packet forwarding device 108 verifies the source of the packet, the destination of the packet, or the LSP to be created, and authorizes the LSP accounting signaling message as a valid LSP accounting signaling message. The classifier engine 422 uses classifier data 322 (FIG. 3) of the associated line card 202 (FIG. 2) in authenticating and authorizing the incoming LSP accounting signaling message.

Next, at block 804, the packet forwarding device 108 determines whether there exist one or more policy matches for the packet. In one embodiment, the line card 202 of the packet forwarding device 202 passes information regarding the received packet to the policy engine 520 (FIG. 5) of the controller 204. The policy engine 520 then checks the information regarding the received packet against a policy table, such as the policy table 600, of FIG. 6 to determine if one or more of the policy rules apply to the LSP accounting signaling message. If there is no policy match, the packet forwarding device 102 returns a failure message to the source of the LSP accounting signaling message indicating a failed transmission, pursuant to block 806.

If the policy engine 520 identifies one or more policy matches pursuant to block 804, execution proceeds to block 808 wherein policy precedence rules are applied if multiple policy hits are obtained to determine the billing party for the packet and associated traffic, such as traffic traversing the same LSP. If the policy engine 520 identifies multiple policy hits, the policy engine 520 applies policy precedence rules to determine a single policy rule to employ and to identify a billing party.

Next, the billing engine 522 determines whether the source of packet is the billing party pursuant to block 810. In particular, the billing engine 522 may use the policy rule identified by the policy engine 520 to determine whether the source of the packet is the billing party for forwarding the packet and the associated traffic.

If the source of the packet is the billing party, then the billing engine 522 sets up the billing and accounting mechanisms per the single policy rule identified by the policy engine in block 708. Specifically, the billing engine 522 creates service-specific counters such as either an incrementing count-up counter or a decrementing count-down counter depending on the particular policy rule. These counters comprise a portion of the classifier engine 422 (FIG. 4) of the port interface 302, which counts the packets forwarded and writes corresponding statistics to the card statistics 326 of the associated line card 202. Moreover, where the packet comprises an LSP accounting signaling message, the billing engine 522 notifies the classifier engine 322 to accept data packets associated with this LSP accounting signaling message. Execution then proceeds to block 824. Details of the block 824 are discussed below.

If billing engine 522 determines that the source is not the billing party pursuant to block 810, execution proceeds to block 814. At block 814, the billing engine 522 determines whether authorization is required before establishing an LSP through the network 100 or forwarding traffic associated with the LSP or forwarding the packet. If the billing engine 522 determines that authorization is required pursuant to the policy rule, the packet forwarding device 180 transmits an authorization request message to a network device designated to provide or deny such authorization pursuant to block 816. For example, if the policy rule of row 634 (FIG. 6) were being employed, the billing engine 522 would determine that authorization by D is required and would transmit an authorization request message to the packet forwarding device 106 at which D, such as the enterprise D 126, is connected. Depending on the policy of the policy engine 520 of the packet forwarding device 106, the packet forwarding device 106 would return a message either authorizing or not authorizing transmission of traffic associated with the LSP accounting signaling message. In one embodiment, policy authorization is carried out off-line and is cached at each node prior to LSP setup.

In block 818, the billing engine 522 of the terminating interface 108 determines whether the packet forwarding device 108 has received a valid authorization associated with the LSP accounting signaling message. If the billing engine 522 determines that the packet forwarding device 108 has not received a valid authorization within a predetermined period of time or has received a refusal of authorization, the billing engine 522 determines that the traffic is not authorized. If the billing engine 522 determines that the traffic is not authorized, the billing engine 522 causes the packet forwarding device 108 to return a failure message to the source of the packet indicating a failed transmission, pursuant to block 820. If the billing engine 522 determines, however, that a valid authorization has been receive, execution proceeds to block 822.

At block 822, the billing engine 522 (FIG. 5) sets up billing and accounting mechanisms per the single policy rule identified by the policy engine in block 808. In particular, the billing engine 522 creates service-specific counters such as either an incrementing count-up counter or a decrementing count-down counter depending on the particular policy rule. These counters comprise a portion of the classifier engine 422 (FIG. 4) of the port interface 302, which counts the packets forwarded and writes corresponding statistics to the card statistics 326 of the associated line card 202. Moreover, in the case of an LSP accounting signaling message, the billing engine 522 notifies the classifier engine 322 to accept data packets associated with this LSP.

Lastly, pursuant to block 824, the packet forwarding device 108 returns an approval message indicating approval of the LSP accounting signaling message in the case of an LSP accounting signaling message or forwarding the packet to a next hop destination outside the network in the case of an IP packet. In one embodiment, the packet forwarding device 108 returns an MPLS "commit" message along the exact reverse path the LSP accounting signaling message traversed through the network 100 to reach the terminating interface, packet forwarding device 108. An MPLS Label Switched Path (LSP), or "tunnel," may then be established through the intermediate interfaces of the network 100 (FIG. 1).

Once the LSP is established through the network 100, the classifier engine 422 of each packet forwarding device along the LSP records statistics of each packet forwarded by the associated line card 202 at the statistics 326. The billing engine 522 periodically copies compilations of the contents of the card statistics 326 to the statistics 526 for later forwarding over the link 142 to the network manager 140 for accounting and billing purposes.

In one embodiment, the network manager 140 disregards statistics sent by packet forwarding devices other than the terminating interface packet forwarding device so as to avoid duplication of statistics for a given packet and to disregard any unintentional packet drops in the network. For example, if a given packet is transmitted along an LSP including the packet forwarding devices 102, 104, and 108 (FIG. 1) with the packet forwarding devices 102 and 104 being intermediate interface and the packet forwarding device 108 being the terminating interface, only statistics from the device 108 would be used by the network manager 140 in making accounting and billing decisions associated with the LSP. Thus, transmission of statistics information from each of the packet forwarding devices 102, 104, and 108 to the network manager 140 is unnecessary as long as at least one of the devices, such as the terminating interface device 108, transmits the statistics information to the network manager 140.

While particular exemplary embodiments have been shown and described, it will be apparent to practitioners that various changes and modifications may be made without departing from this invention in its broader aspects. Accordingly, the appended claims encompass all such changes and modifications as fall within the scope of this invention.

What is claimed is:

1. A method for policy based accounting in an Multi-Protocol Label Switched network, the method comprising:
   receiving a label switched path (LSP) signaling message at a first packet forwarding device;
   accessing a policy table to identify a billing party associated with the signaling message;
   forwarding the signaling message to a second downstream packet forwarding device only subsequent to identifying the associated billing party in the policy table.

2. The method for policy based accounting of claim 1, further comprising returning a message to a source of the packet to be forwarded indicating a failed transmission if the policy table does not identify a billing party associated with the packet.

3. The method for policy based accounting of claim 1, further comprising transmitting an authorization request message associated with the packet and only forwarding the packet subsequent to receiving an authorization approval message associated with the packet.

4. The method for policy based accounting of claim 1, the method further comprising:

determining whether the billing party requires authorization before forwarding the packet;

transmitting an authorization request message associated with the packet;

forwarding the packet only subsequent to receiving an authorization approval message associated with the packet.

5. The method for policy based accounting of claim 1, further comprising transmitting the recorded data to a network management computer.

6. The method for policy based accounting of claim 1, wherein the policy table comprises a table identifying a billing party for a particular set of circumstances associated with the packet.

7. A packet forwarding device, comprising:

a port interface for receiving a label switched path (LSP) signaling message; and a policy engine including a policy table for determining a billing party associated with the signaling message, wherein the signaling message is forwarded to a second downstream packet forwarding device only subsequent to identifying the associated billing party in the policy table.

8. The packet forwarding device of claim 7, wherein the policy table includes rules identifying a billing party and a payment mechanism for different data packets.

9. The packet forwarding device of claim 7, further comprising:

a memory;

a classifier engine for recording statistics associated with data packets forwarded by the packet forwarding device to the memory, each statistic identifying the associated billing party.

10. The packet forwarding device of claim 9, further comprising a billing engine for transmitting information including at least a portion of the recorded statistics to a remote computer.

11. The packet forwarding device of claim 7 further comprising a user interface to permit the policy table to be modified from a remote computer.

12. The packet forwarding device of claim 7, wherein the table identifies a first payment mechanism for a first set of data packets and a second payment mechanism for the second set of data packets, the first payment mechanism being different from the second payment mechanism.

13. The packet forwarding device of claim 7, wherein the table identifies the destination of the data packet as the billing party for at least one set of data packets.

14. The packet forwarding device of claim 7, wherein the table identifies a source from which authorization must be received before forwarding an associated data packet.

15. The packet forwarding device of claim 7, wherein the table identifies the billing party based at least in part on a current time of day.

16. A packet forwarding device, comprising:

means for receiving a label switch path (LSP) signaling message at a first packet forwarding device;

means for accessing a policy table to identify a billing party associated with the signaling message;

means for forwarding the signaling message to a second downstream packet forwarding device only subsequent to identifying the associated billing party in the policy table.

17. A system for policy based accounting in an Multi-Protocol Label Switched network, the system comprising:

means for receiving a label switched path (LSP) signaling message at a first packet forwarding device;

means for accessing a policy table to identify a billing party associated with the signaling message;

means for forwarding the signaling message to a second downstream packet forwarding device only subsequent to identifying the associated billing party in the policy table.

18. A computer-readable medium comprising program instructions for causing a data processor to execute a method comprising:

receiving a label switched path (LSP) signaling message at a first packet forwarding device;

accessing a policy table to identify a billing party associated with the signaling message;

forwarding the signaling message to a second downstream packet forwarding device only subsequent to identifying the associated billing party in the policy table.

* * * * *